United States Patent [19]
Obayashi et al.

[11] Patent Number: 5,802,039
[45] Date of Patent: Sep. 1, 1998

[54] MOBILE RADIO COMMUNICATION APPARATUS WITH SYNCHRONIZED RECEPTION RECOVERING FUNCTION

[75] Inventors: Arata Obayashi; Naoyuki Wakabayashi; Ken Nakamura, all of Tokyo, Japan

[73] Assignee: Kabushiki Kaisha Toshiba, Kawasaki, Japan

[21] Appl. No.: 652,992

[22] Filed: May 24, 1996

Related U.S. Application Data

[63] Continuation of Ser. No. 172,939, Dec. 27, 1993, abandoned.

[30] Foreign Application Priority Data

Dec. 28, 1992 [JP] Japan ............... 4-348664
Nov. 10, 1993 [JP] Japan ............... 5-281280

[51] Int. Cl.$^6$ .................. H04J 3/06; H04J 3/14
[52] U.S. Cl. ............ 370/216; 370/350; 371/5.1; 371/47.1; 455/67.1; 395/185.1
[58] Field of Search ............... 370/13, 14, 17, 370/95.1, 95.3, 100.1, 105.1, 105.2, 105.4, 55; 375/106, 107, 108, 114, 116, 354, 365, 368; 371/5.1, 5.4, 5.5, 29.1, 47.1; 379/58, 59; 455/33.1, 54.1, 67.1, 166.1; 395/185.01, 185.1

[56] References Cited

U.S. PATENT DOCUMENTS

| | | | |
|---|---|---|---|
| 4,059,729 | 11/1977 | Eddy et al. | 370/55 |
| 4,710,924 | 12/1987 | Chum | 371/5.1 |
| 5,138,616 | 8/1992 | Wagner, Jr. et al. | 371/5.1 |
| 5,163,161 | 11/1992 | Bowles et al. | 455/164.1 |
| 5,177,740 | 1/1993 | Toy et al. | 370/100.1 |

*Primary Examiner*—Hassan Kizou
*Attorney, Agent, or Firm*—Finnegan, Henderson, Farabow, Garrett & Dunner, L.L.P.

[57] ABSTRACT

Disclosed is a mobile radio communication apparatus having a sync restoring control function equipped in a controller. When disconnection of reception is detected during communication, the sync restoring control function sends a sync acknowledge indicate signal to a digital demodulator within a cutoff allowance period to re-establish synchronized reception. The bit error rate is detected during communication, and a BER code indicating this bit error rate is displayed on a display.

13 Claims, 11 Drawing Sheets

| DISPLAY DIGIT | | | | CONTROL CHANNEL BEING SET | VOICE CHANNEL BEING SET |
|---|---|---|---|---|---|
| X1 | X2 | X3 | X4 | RECEPTION CHANNEL NO | RECEPTION CHANNEL NO. |
| | | | X5 | BLANK | SLOT NO. |
| X6 | X7 | | X8 | RSSI | RSSI |
| | | | X9 | BLANK | BER |
| | X10 | | X11 | - - | DVCC |
| | | | X12 | - | DVCC |
| | | | X13 | TRANSMISSION POWER LEVEL | TRANSMISSION POWER LEVEL |
F I G. 6
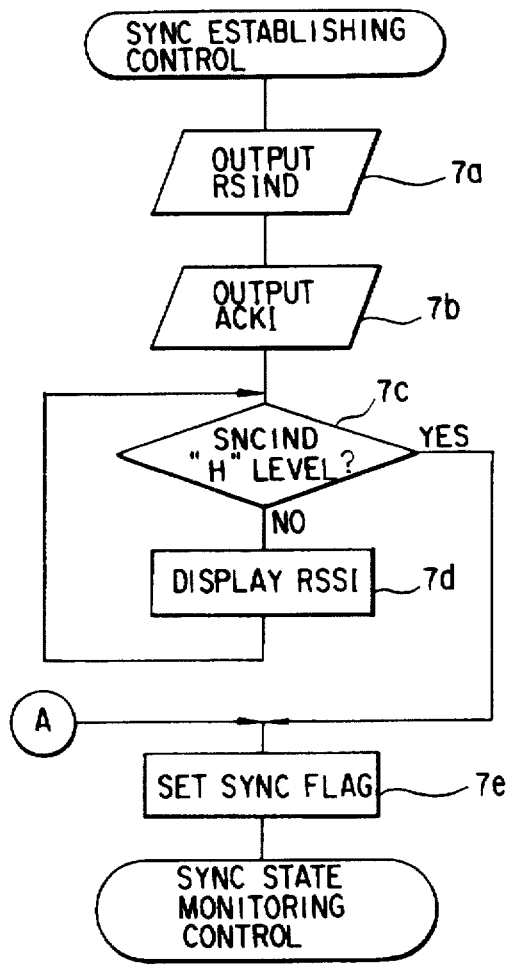
F I G. 7

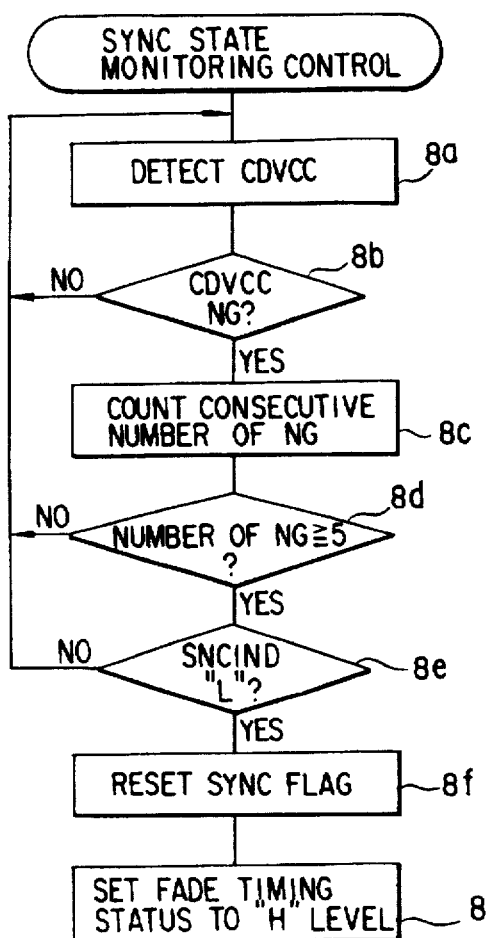
F I G. 8
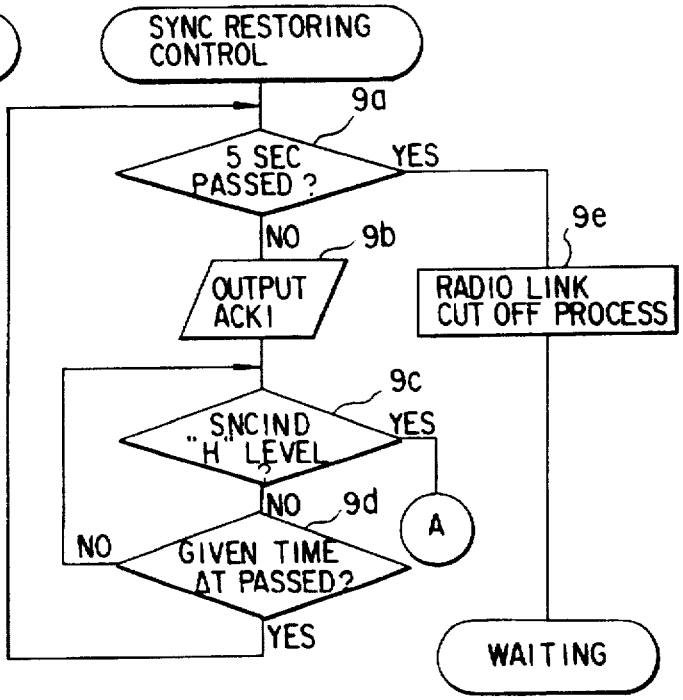
F I G. 9

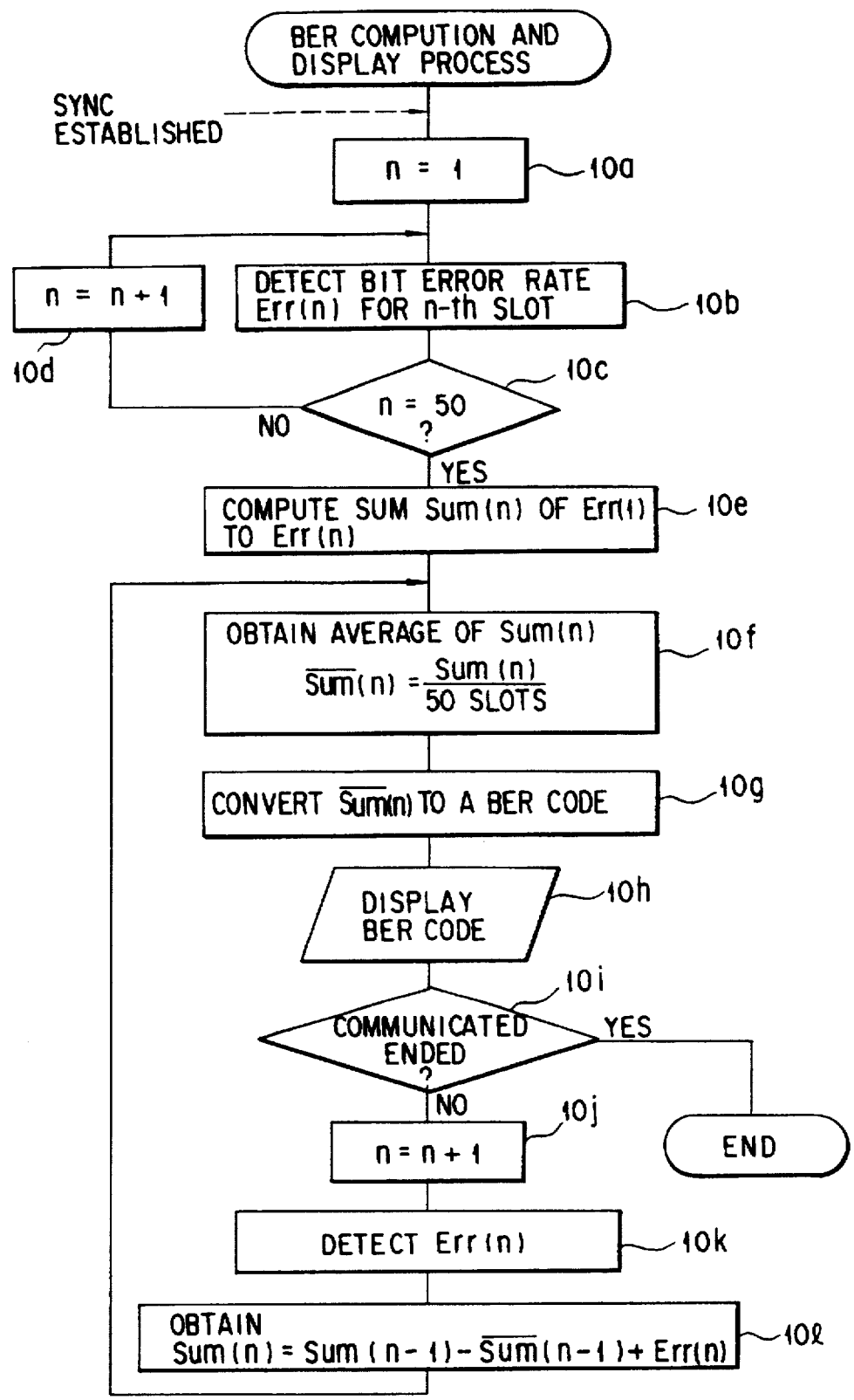
F I G. 10

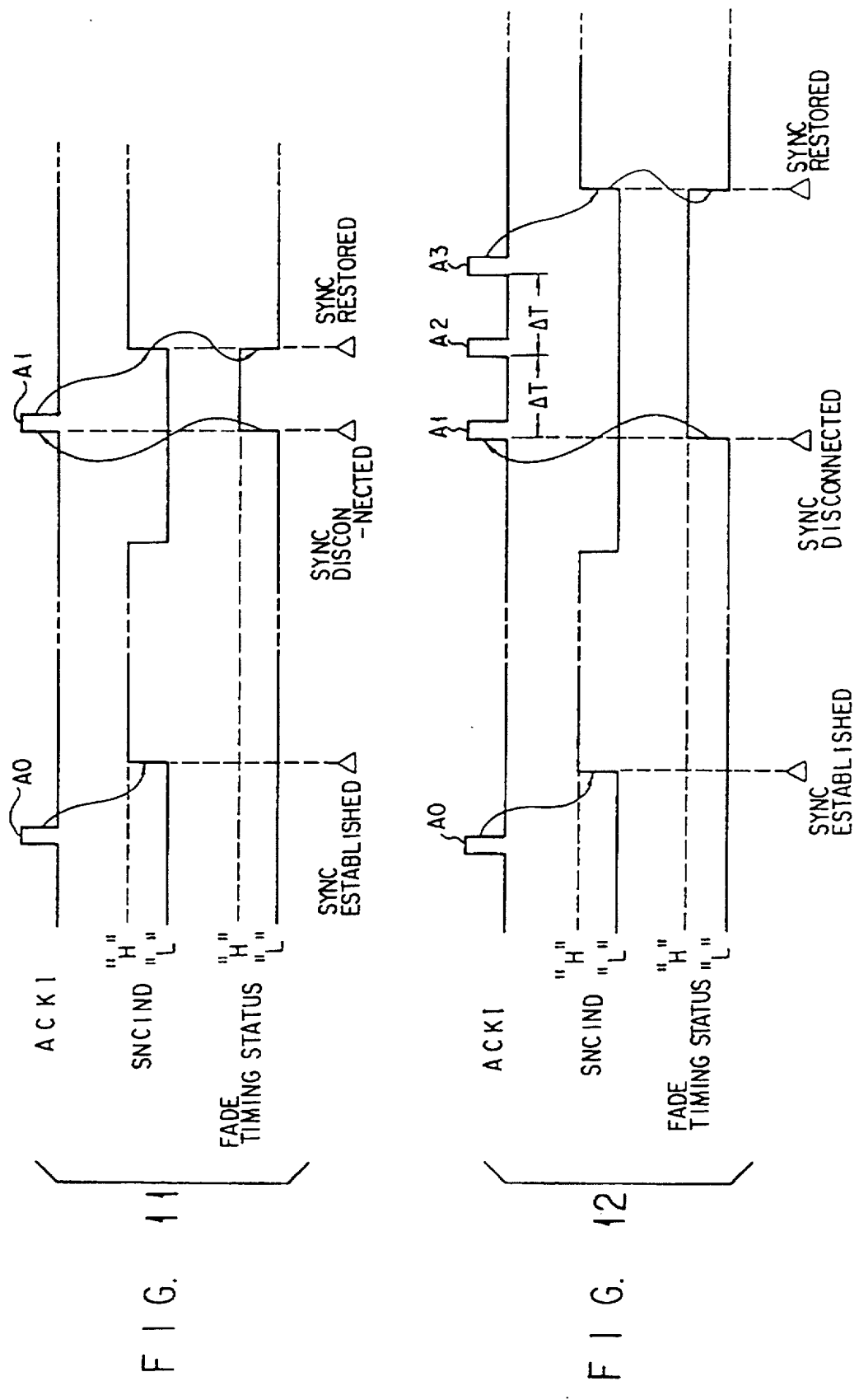

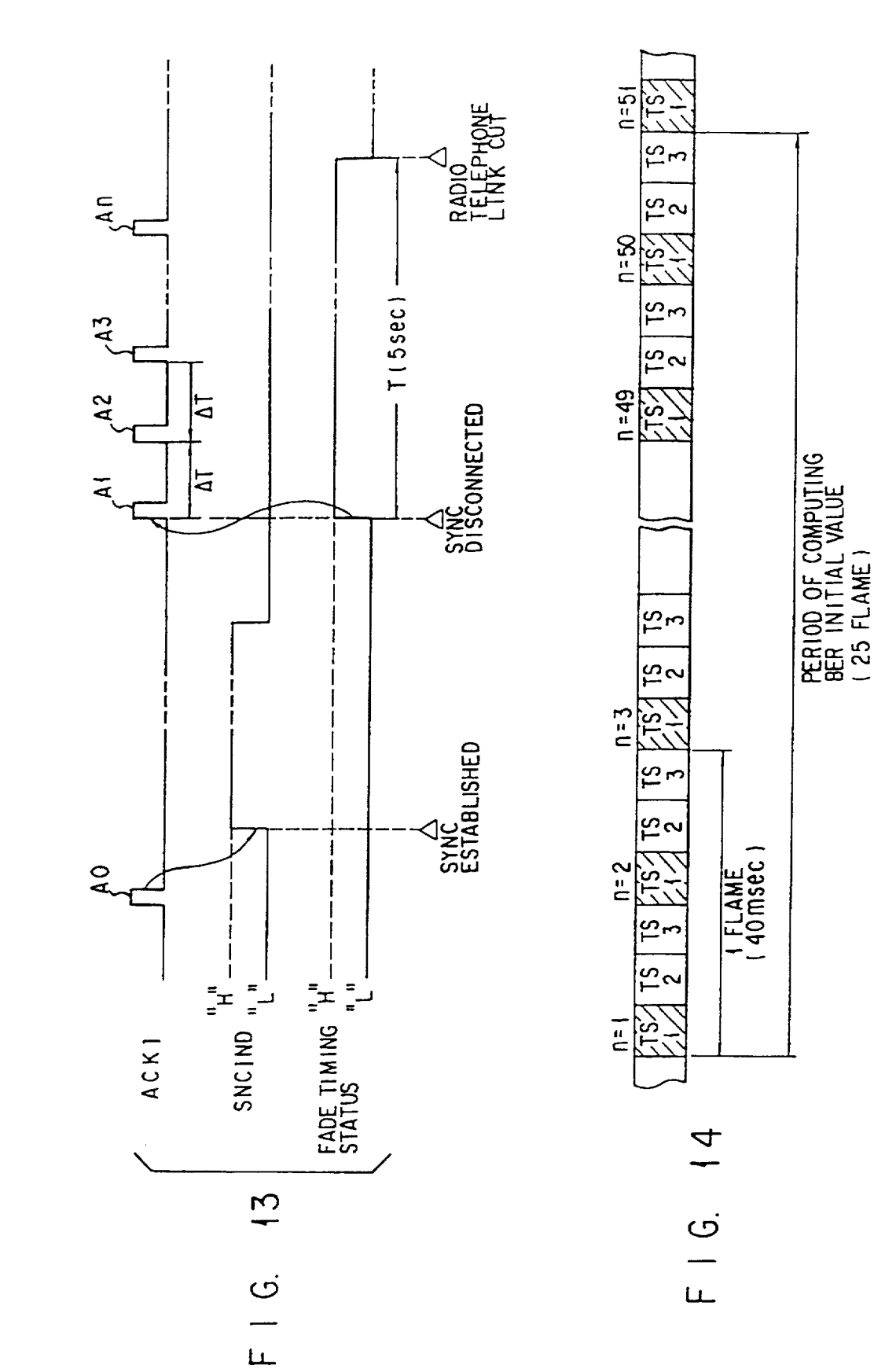

| $\overline{SUM}(n)$ | BER VALUE | BER CODE |
|---|---|---|
| LESS THAN 0.0178 | LESS THAN 0.01 | 0 |
| 0.0178 – 0.178 | 0.01 – 0.1 | 1 |
| 0.178 – 0.445 | 0.1 – 0.5 | 2 |
| 0.445 – 1.78 | 0.5 – 1.0 | 3 |
| 1.78 – 3.56 | 1.0 – 2.0 | 4 |
| 3.54 – 7.12 | 2.0 – 4.0 | 5 |
| 7.12 – 14.24 | 4.0 – 8.0 | 6 |
| 14.24 OR ABOVE | 8.0 OR ABOVE | 7 |
F I G. 15
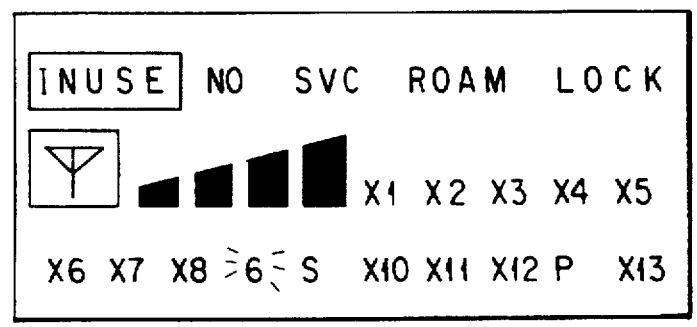
F I G. 16

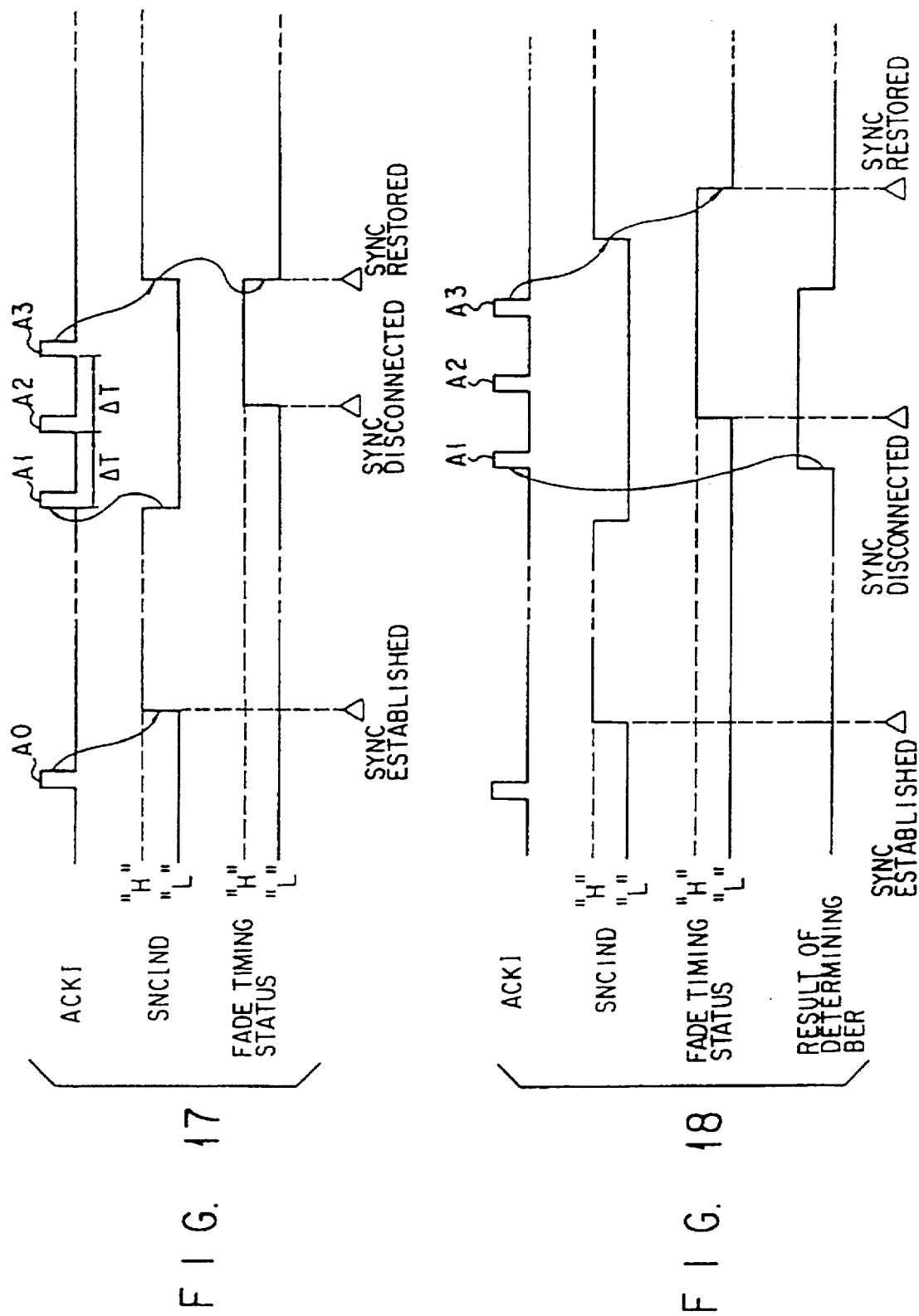

MOBILE RADIO COMMUNICATION APPARATUS WITH SYNCHRONIZED RECEPTION RECOVERING FUNCTION

This application is a continuation, of application Ser. No. 08/172,939 filed Dec. 27, 1993, now abandoned.

BACKGROUND OF THE INVENTION

1. Field of the Invention

The present invention relates to mobile radio communication apparatuses, such as mobile telephones, portable telephones and cordless telephones, and, more particularly, to a mobile radio communication apparatus which has a function to detect a sync acknowledge signal included in a time-division multiplexed signal transmitted from a base station to thereby establish the synchronized reception for the time-division multiplexed signal.

2. Description of the Related Art

Recently, a system using a digital communication system or dual mode communication system has been proposed to replace a conventional mobile radio communication system which performs radio transmission of communication signals in an analog communication system. The dual mode communication system is a combination of an analog communication system and a digital communication system.

The digital communication system encodes the communication contents, such as a speech signal or an image signal, in a transmitting device and digitally modulates a carrier with the encoded signal. A receiving device receives and digitally demodulates the modulated wave sent from the transmitting device, and decodes the demodulated signal to reproduce the communication contents.

As the digital modulating/demodulating system, for example, a π/4 shifted DQPSK (Differentially encoded Quadrature Phase Shift keying) system is used.

The communication using this digital communication system requires that a mobile radio communication apparatus should establish the synchronized reception of a time-division multiplexed signal transmitted from a base station. The synchronized reception is established by detecting a signal for sync acknowledgement inserted in each slot of the time-division multiplexed signal transmitted from the base station.

That is, a SYNC (Synchronization and Training) Signal and a CDVCC (Coded Digital Verification Color Code) signal are inserted at the head of each slot of a time-division multiplexed signal, as shown in FIG. 20. At the time of establishing synchronization, first, a digital demodulator in the mobile radio communication apparatus detects a SYNC signal corresponding to a pre-specified slot from the received time-division multiplexed signal. When a desired SYNC signal is detected, whether or not the SYNC signal is consecutively detected in a given number of subsequent frames is monitored. When this consecutive detection of the SYNC signal is accomplished, synchronization is established at that time.

This type of conventional mobile radio communication apparatus however has the following problems. Suppose that the apparatus comes behind a building or inside a tunnel and cannot receive a SYNC signal. Then, the apparatus determines if a CDVCC signal can correctly be detected. If consecutive detection of this CDVCC signal for five slots fails and several seconds elapses thereafter, for example, the radio telephone link will be cut off to become ready for reception again. That is, only the operation of determining the reception of the CDVCC signal is performed during a period from the point where the detection of the SYNC signal becomes disabled to the point where the radio telephone is cut off.

Even when the mobile radio communication apparatus comes out of the building or tunnel to be able to receive radio waves with sufficient strength from the base stable before the radio telephone link is actually cut off, therefore, once the synchronized reception is disconnected, it is difficult to restore the synchronized reception to the original one by the discrimination of the reception of the CDVCC signal alone.

Further, the conventional mobile radio communication apparatus used in, for example, a cellular radio system measures the receiving signal strength of a radio wave coming from the base station during communication and indicates the measured value of the receiving signal strength. A user can therefore find out if the apparatus is located within a communicatable area by checking the indicated measured value of the receiving signal strength.

In a place where multi-path phasing frequently occurs, such as an office area with many buildings, however, even with a sufficiently high receiving signal strength, the error ratio of received data may increase, thus deteriorating the quality of the received speech. In this case, the user cannot understand why the reception condition has become poor, and may erroneously judge that the apparatus is malfunctioning.

SUMMARY OF THE INVENTION

It is therefore a primary object of the present invention to provide a mobile radio communication apparatus, which can restore the state of synchronized reception, even when temporarily disabled, at a high probability, and thus resume communication.

It is another object of this invention to provide a mobile radio communication apparatus capable of indicating the cause of the deterioration of reception conditions more properly.

To achieve the first object, according to one aspect of this invention, there is provided a mobile radio communication apparatus which comprises first sync establishing means for detecting a sync acknowledge signal included in a time-division multiplexed signal and establishing synchronized reception of the time-division multiplexed signal when the sync acknowledge signal is detected under a predetermined condition; sync state monitoring means for monitoring a state of synchronized reception established by the first sync establishing means; radio link cutoff means for cutting off a radio link when disconnection of synchronized reception is detected by the sync state monitoring means and the disconnection of synchronized reception continues for a first predetermined period; and second sync establishing means. This second sync establishing means performs an operation to restore the synchronized reception of the time-division multiplexed signal during the first period.

According to this invention, therefore, when disconnection of synchronized reception is detected during radio communication, the second sync establishing means performs an operation to restore the synchronized reception. Even if the condition of a radio channel is temporarily deteriorated to disconnect synchronized reception due to temporary entrance of the apparatus inside a tunnel or behind a building, the influence of multi-path phasing and some other reason, the apparatus will restore the synchronized reception at a high probability when the apparatus becomes ready again to receive a time-division multiplexed signal with a sufficient receiving signal strength. The radio communication can therefore be resumed without causing the radio link to be cut off by temporary disconnection of synchronized reception.

It is preferable that the operation of the second sync establishing means for restoring the synchronized reception be repeated until the synchronized reception is restored. This way, it is possible to restore the synchronized reception of the apparatus at a higher probability.

While an operation to restore synchronized reception is being conducted, information to that effect may be displayed. This allows the user to find out the state of the apparatus based on the displayed information.

The sync state monitoring means may acknowledge that disconnection of synchronized reception has occurred when the detection of the sync acknowledge signal to be detected fails. This permits the apparatus to a stage of performing the operation for restoring synchronized reception immediately after the occurrence of the disconnection of synchronized reception is detected, thus shortening the duration of the disconnection of synchronized reception as much as possible.

Further, the sync state monitoring means may acknowledge the occurrence of the disconnection of synchronized reception, when the detection of the sync acknowledge signal to be detected fails and the correct reception of predetermined code data consecutively fails during a second period. This design prevents temporary detection of no sync acknowledge signal by instantaneous cutoff of a radio wave from being erroneously recognized as disconnection of synchronized reception. As a result, the synchronized-reception restoring operation can be performed only when synchronized reception truly occurs.

Furthermore, the sync state monitoring means may monitor the state of synchronized reception established by the first sync establishing means, based on the bit error of the received time-division multiplexed signal, and may acknowledge that disconnection of synchronized reception has occurred when the bit error increases to or above a predetermined value. This makes it possible to detect the disconnection of synchronized reception even from the receiving state of data other than the sync acknowledge signal. If the means for detecting the bit error is already provided, no additional bit error detecting means is necessary and the disconnection of synchronized reception can be detected based on the detected value from the existing bit error detecting means.

To achieve the second object, according to another aspect of this invention, there is provided a mobile radio communication apparatus comprising bit error detecting means and display means. The bit error detecting means detects the bit error of the time-division multiplexed signal received, and the display means displays information representing the degree of the detected bit error.

According to this invention, therefore, in the case where the reception level of a radio wave is temporarily dropped due to, for example, temporary entrance of the apparatus inside a tunnel or behind a building, or the influence of multi-path phasing, and the error rate of the received data thus increases, deteriorating the quality of a received speech, the user can determine from the display of the bit error why the reception condition has been deteriorated. This allows the user to properly know the state of the apparatus, and thus prevent the user from erroneously judging the deterioration of the reception quality as having originated from the malfunction of the apparatus.

According to this invention, the bit error detecting means detects bit error values for a plurality of predetermined reception target slots to obtain an average value of the bit error values, and, detects the bit error value of a new reception target slot and obtains a new average value from the his bit error value and the last average value every time the reception target slot is newly received thereafter. And the degree of the bit error is determined based on the average value and information representing the determination result is displayed by the display means.

As the degree of the bit error is determined on the basis of the average value of the bit error values of a plurality of reception target slots, it is possible to stably determine the bit error. Once the average value of the bit error values is obtained, the average value is updated thereafter based on the previous average value and a new bit error value. This can reduce the memory capacity required for the bit error computation as compared with the case where the old bit error values for a predetermined number of slots are all stored in a memory and the average value for a new bit error is calculated based on those bit error values and the bit error value detected in a new reception target slot. Further, the amount of computation can be reduced, which shortens the time needed to calculate the average value for the new bit error, thus improving the response of the bit-error display operation.

The display means may be designed in such a way as to display information representing the degree of each bit error detected by the bit error detecting means in response to the inputting of a display instruction by switch input means. This allows the user to know the degree of the bit error when needed.

Further, the bit error detecting means may be designed to start detecting the bit error in response to the formation of an associated radio link. This can ensure more spontaneous display of the bit error information in response to the inputting of the bit-error display instruction, as compared with the case where the detection of the bit error starts in response to the inputting of the bit-error display instruction through the switch input means.

Furthermore, the display means may be designed to convert each detected bit error value to an associated one of a plurality of predetermined levels and display information representing this converted level. This allows the user to easily check the degree of the bit error. At that time, the information which represents the level of each detected bit error may be blinked and the blinking speed may be changed in accordance with the level, so that the user will roughly understand the degree of the bit error from the blinking speed.

According to a further aspect of this invention, there is provided a mobile radio communication apparatus which comprises first detecting means for detecting a receiving signal strength of the time-division multiplexed signal; second detecting means for detecting a bit error of the time-division multiplexed signal received; and reception quality display means for selectively displaying the receiving signal strength detected by the first detecting means and information representing a degree of the bit error detected by the second detecting means, on a common display unit.

With this structure, when the reception quality is dropped, the user will know the state of the apparatus from both the receiving signal strength and the bit error. The user can therefore know the reception state of the apparatus more properly. In addition, it is unnecessary to provide a plurality of display units, thus contributing to making the apparatus smaller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a diagram showing the contents of what is displayed on the display shown in FIG. 5;

FIG. 7 is a flowchart showing control procedures of synchronization establishing control in the portable telephone shown in FIG. 2;

FIG. 8 is a flowchart showing control procedures of sync state monitoring control in the portable telephone shown in FIG. 2;

FIG. 9 is a flowchart showing control procedures of sync restoring control in the portable telephone shown in FIG. 2;

FIG. 10 is a flowchart showing a BER calculation process in the portable telephone shown in FIG. 2;

FIG. 11 is a timing chart for explaining one example of the sync restoring operation;

FIG. 12 is a timing chart for explaining another example of the sync restoring operation;

FIG. 13 is a timing chart for explaining a further example of the sync restoring operation;

FIG. 14 is a diagram showing the period for calculating the initial BER value;

FIG. 15 is a diagram showing the correlation between the detected value of BER and the BER display code;

FIG. 16 is a diagram showing a display example of the BER display code;

FIG. 17 is a timing chart for explaining the sync restoring operation in a portable telephone according to another embodiment of this invention;

FIG. 18 is a timing chart for explaining the sync restoring operation in a portable telephone according to a further embodiment of this invention;

DETAILED DESCRIPTION OF THE PREFERRED EMBODIMENTS

Figure 1:
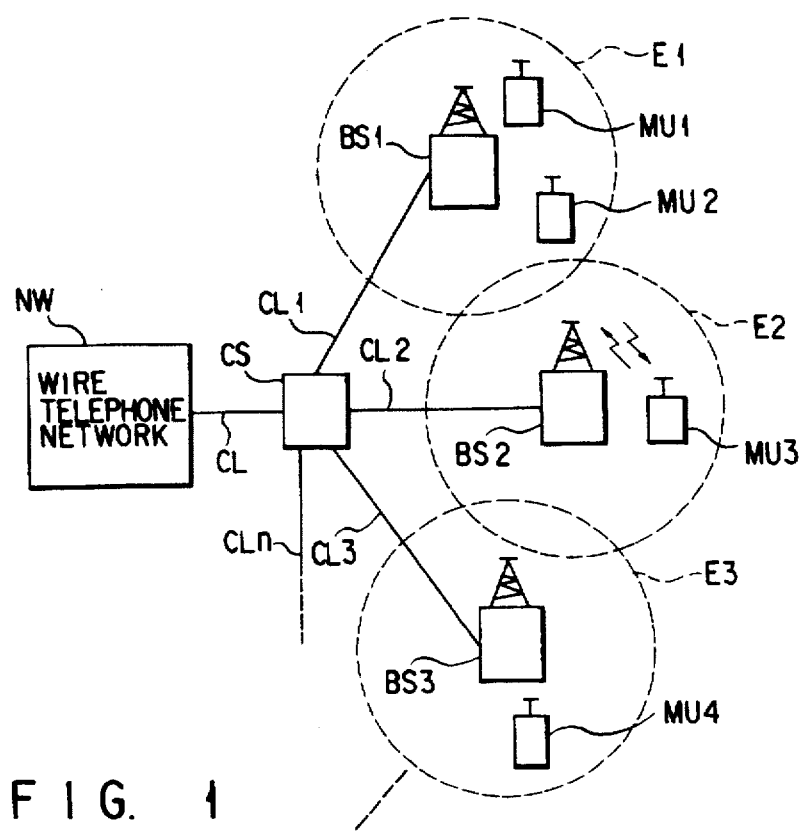
FIG. 1 is a diagram schematically showing the structure of a dual-mode cellular radio communication system according to one embodiment of the present invention.

FIG. 1 schematically shows the structure of a dual-mode cellular radio communication system according to one embodiment of the present invention.

This system includes a control station CS, a plurality of base stations BS1 to BS3, and a plurality of mobile units MU1 to MU4. The control station CS is connected via a cable line CL to a wire telephone network NW. The base stations BS1 to BS3 are connected to the control station CS via respective cable lines CL1 to CL3. The individual base stations BS1 to BS3 form radio zones E1 to E3 each called a cell. The mobile stations MU1 to MU4 are connected via radio channels to the respective base stations BS1 to BS3 in the radio zones E1 to E3. The radio channels are classified to a group of control channels and a group of voice channels. The voice channels include a plurality of analog voice channels for the analog mode and a plurality of digital voice channels for the digital mode.

Figure 2:
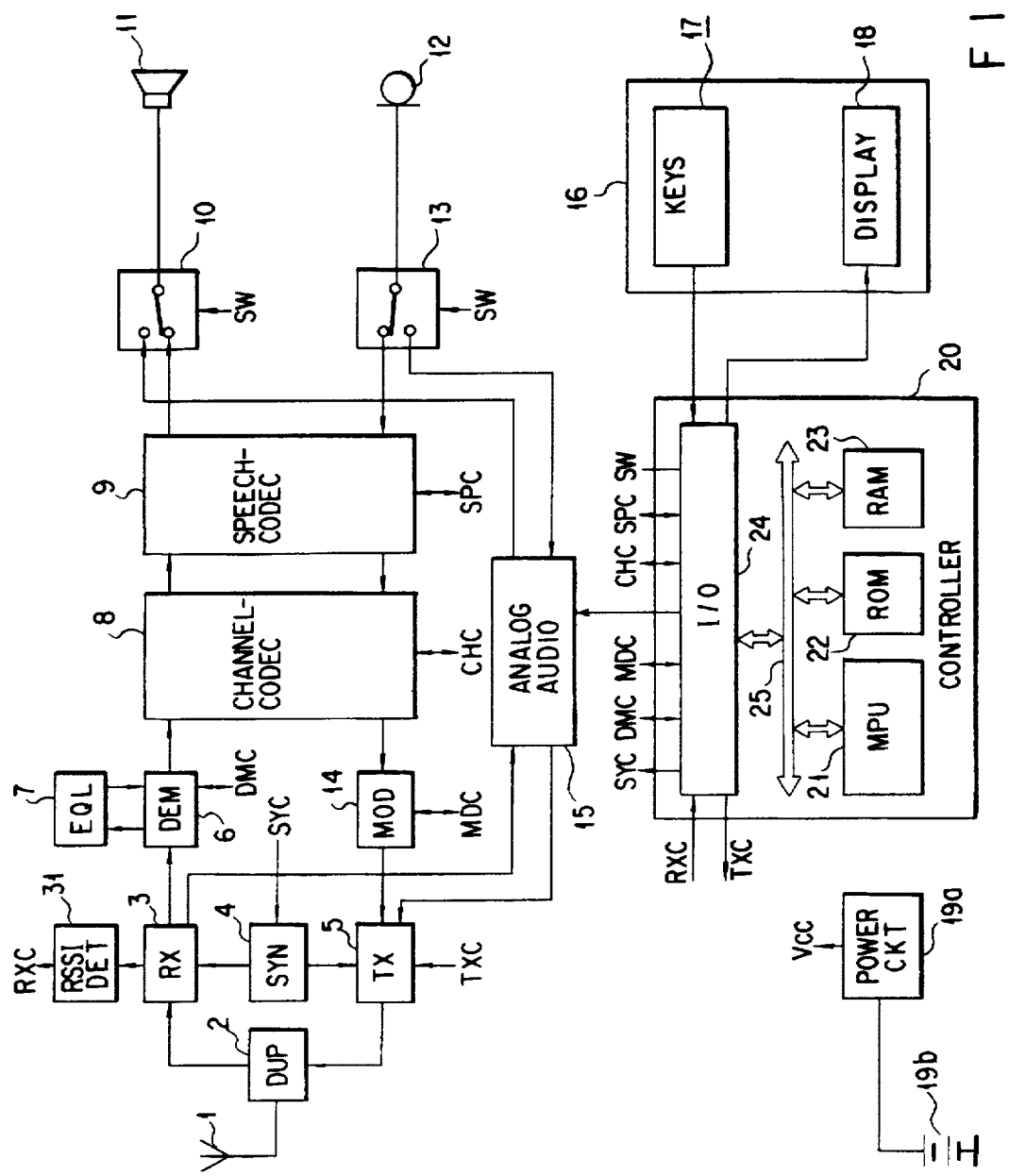
FIG. 2 is a block diagram showing the structure of a portable telephone used in the system in FIG. 1.

The individual mobile stations MU1 to MU4 include a portable telephone unit and a mobile telephone unit. FIG. 2 presents a circuit block diagram showing the structure of that portable telephone.

To begin with, the structure of the portion associated with the digital mode will be explained. A radio frequency signal sent via a digital voice channel from any of the base stations BS1–BS32 is received by an antenna 1 and is then input via a duplexer 2 to a receiver 3. The receiver 3 mixes the radio frequency signal with a reception local oscillation signal output from a frequency synthesizer 4 to be frequency-converted to an intermediate frequency signal. The frequency of the reception local oscillation signal generated by the frequency synthesizer 4 is specified by a channel control signal SYC output from a controller 20.

The receiver 3 is provided with a receiving signal strength detector 31. This detector 31 detects a receiving signal strength from the level of the received signal, and sends the detected value (receiving signal strength indicator: RSSI) to the controller 20.

Figure 3:
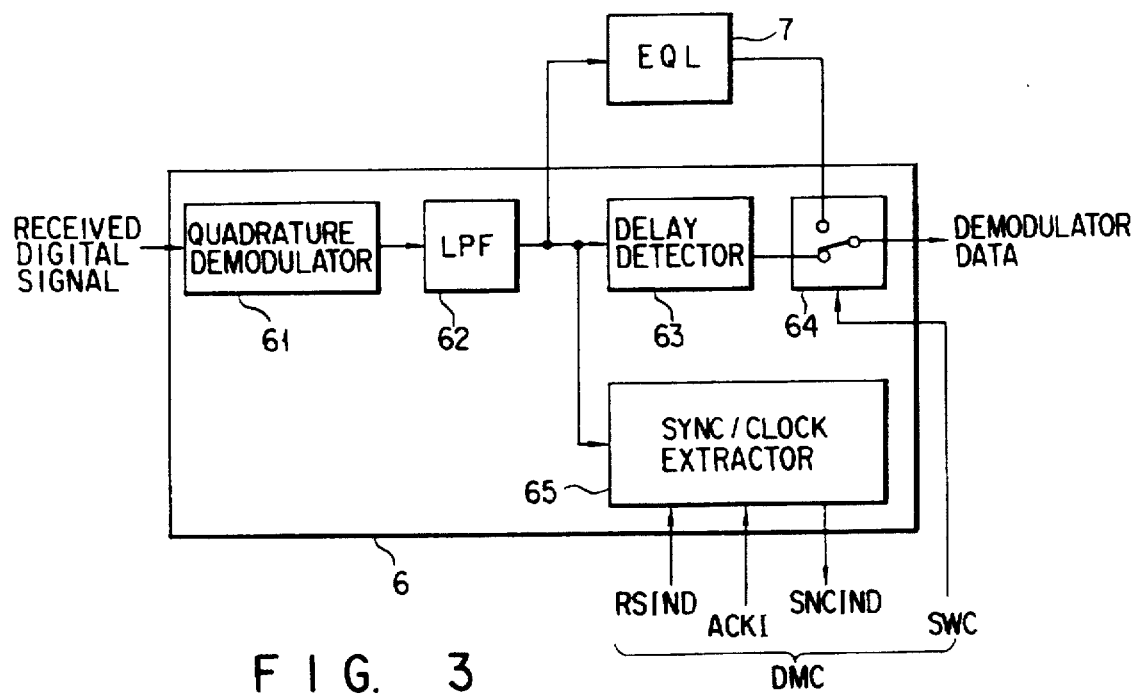
FIG. 3 is a block diagram showing the structure of a digital demodulator of the portable telephone shown in FIG. 2.

The received intermediate frequency signal is converted by an A/D converter (not shown) to a digital signal, which is then input to a digital demodulator 6. The digital demodulator 6 digitally demodulates the received digital signal to a digital base-band signal. FIG. 3 presents a circuit block diagram showing the structure of the demodulator 6.

In this diagram, the received digital signal is first subjected to quadrature demodulation in an quadrature demodulator 61, and its unnecessary wave component is removed by a low-pass filter (LPF) 62. The resultant signal is then subjected to delay detection by a delay detector 63. The digital demodulated signal after passing the LPF 62 is also input to an equalizer 7. This equalizer 7 equalizes the waveform of the digital demodulated signal. One of the digital demodulated signal output from the delay detector 63 and the digital demodulated signal output from the equalizer 7 is selectively output by a selector 64. The switching action of the selector 64 is executed by a switch control signal SWC which is output from the controller 20. The received digital signal, selectively output from the selector 6, includes a digital speech signal and a digital control signal. The digital control signal is sent to the controller 20 to be identified there. The digital speech signal is sent to the equalizer 7 where its demodulated waveform is equalized, and the resultant signal is input to a channel-encoder/decoder (hereinafter called "channel-codec") 8.

The digital demodulator 6 is provided with a sync/clock extractor 65. This sync/clock extractor 65 performs an operation to establish synchronized reception of the received digital signal in accordance with a reception slot indicating information RSIND and a sync acknowledge indicate signal ACKI, both given from the controller 20. When synchronized reception is established, a sync indicate signal SNC-IND of an "H" level representing that synchronized reception has been established is output.

The channel-codec 8 performs error correction and decoding on the digital speech signal sent from the digital demodulator 6. The resultant digital speech signal is input to a speech-encoder/decoder (hereinafter called "speech-codec") 9.

The speech-codec 9 performs speech decoding on the digital speech signal. The speech signal output from the speech-codec 9 is converted to an analog speech signal by a D/A converter (not shown) before being input to an analog switch 10. The switching of the analog switch 10 is controlled by the switch control signal SW from the controller 20 in such a way that the analog speech signal from the speech-codec 9 is selectively output in digital mode. Therefore, the speech signal output from the speech-codec 9 is supplied via the analog switch 10 to a loudspeaker 11 from which a speech is produced.

A transmission speech signal output from a microphone 12 is input to an analog switch 13. At this time, the switching of the analog switch 13 is controlled in accordance with the switch control signal SW from the controller 20 in such a way that with the digital mode set, the transmission speech signal is input to the speech-codec 9. Thus, this speech signal is input via the analog switch 13 to an A/D converter (not shown) where it is converted to a digital transmission speech signal. This digital transmission speech signal is then input to the speech-codec 9.

The speech-codec 9 performs speech decoding on the digital transmission speech signal. The digital transmission speech signal from the speech-codec 9 is input together with the digital control signal from the controller 20 to the channel-codec 8. The channel-codec 8 performs error correction and decoding on the digital transmission speech signal and digital control signal. The encoded digital transmission speech signal is input to a digital modulator 14. This digital modulator 14 produces a modulated signal subjected to n/4 shifted DQPSK modulated in accordance with the digital transmission speech signal. This modulated signal is converted to an analog signal by a D/A converter (not shown), and this analog signal is then input to a transmitter 5. The transmitter 5 combines the modulated signal with a transmission local oscillation signal output from the frequency synthesizer 4 to become a radio frequency signal whose high frequency component is amplified. The radio transmission signal output from the transmitter 5 is supplied via the duplexer 2 to the antenna 1 from which it is transmitted to the base station BS.

A description will now be given of the structure of the portion which concerns with the analog mode. A radio frequency signal which is sent over an analog voice channel from a base station is received by the antenna 1. This signal is then input via the duplexer 2 to the receiver 3 where it is converted down to an intermediate frequency signal. The received intermediate frequency signal output from the receiver 3 is input to an analog audio circuit 15. This analog audio circuit 15 performs FM demodulation of the intermediate frequency signal and then performs speech amplification. The base-band analog speech signal output from the analog audio circuit 15 is input to the analog switch 10. At this time, the switching of the analog switch 10 is controlled in accordance with the switch control signal SW from the controller 20 in such a way that with the analog mode set, the analog speech signal is selectively output. Therefore, the analog speech signal output from the analog audio circuit 15 is supplied via the analog switch 10 to the loudspeaker 11 from which a speech is produced.

A transmission speech signal output from the microphone 12 is input to the analog switch 13. At this time, the switching of the analog switch 13 is controlled in accordance with the switch control signal SW from the controller 20 in such a way that with the analog mode set, the transmission speech signal is input to analog audio circuit 15. Thus, the transmission speech signal is input via the analog switch 13 to the analog audio circuit 15. The analog audio circuit 15 produces an FM modulated signal, which is then sent to the transmitter 5. The transmitter 5 mixes the modulated signal with a transmission local oscillation signal generated from the frequency synthesizer 4 to be converted up to a radio frequency signal whose high frequency component is amplified. The radio transmission signal output from the transmitter 5 is supplied via the duplexer 2 to the antenna 1 from which it is transmitted to the base station BS.

Figure 4:
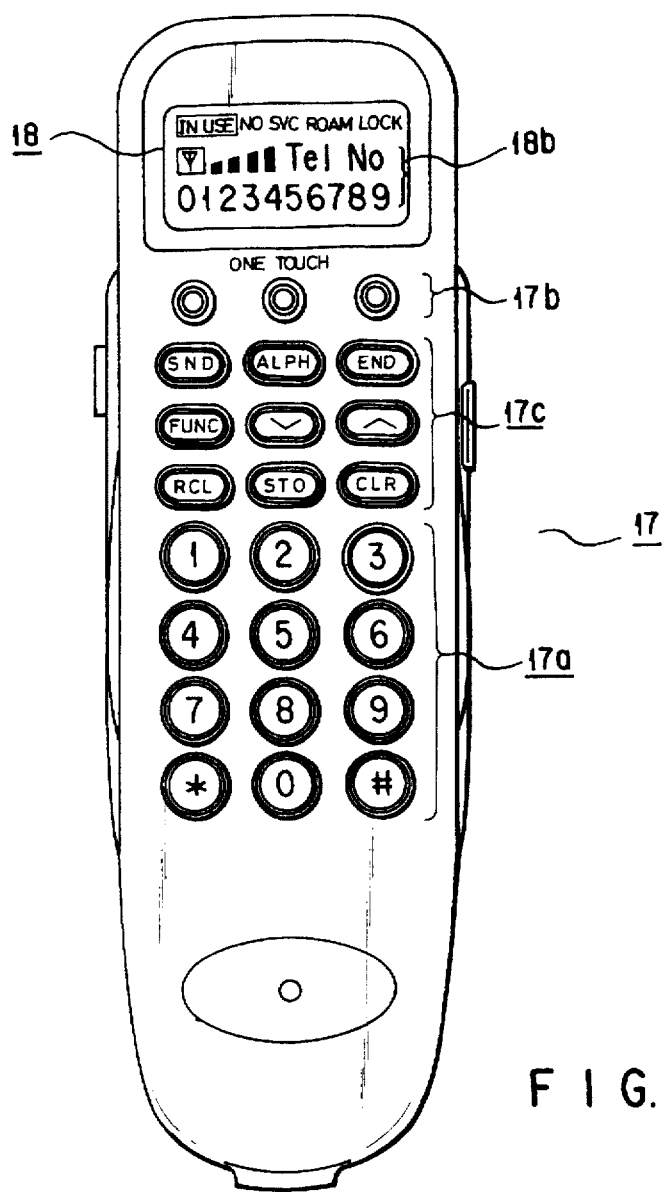
FIG. 4 is a front view showing the outline of the portable telephone used in the system in FIG. 1.
Figure 5:
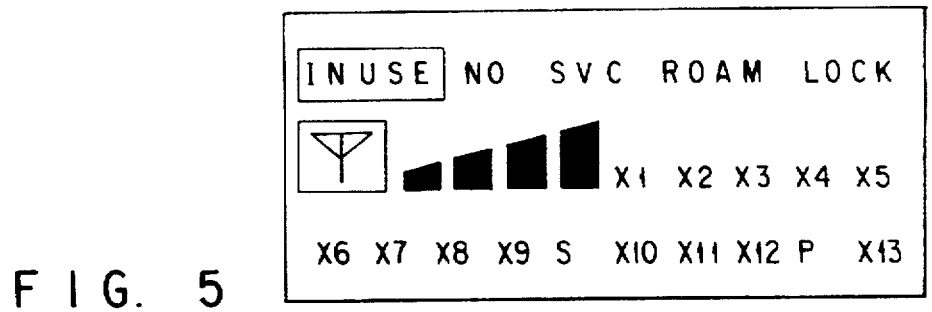
FIG. 5 is a diagram showing the structure of a display of the portable telephone shown in FIG. 4.

A console unit 16 is provided with key switches 17 and a display 18. FIG. 4 is a front view of the portable telephone showing a specific example of the arrangement of the key switches 17 and the display 18. The display 18 may be a liquid crystal display (LCD). FIG. 5 shows the structure of the display screen. In the diagram, the level of the detected RSSI value is converted to a bar chart and is analogously displayed on an RSSI display section 18a under the control of the controller 20. Alphanumeric display digits $X_1$ to $X_{13}$ display various kinds of information representing the operation statuses of the portable telephone under the control of the controller 20. FIG. 6 shows the contents of information to be displayed. For example, of the information to be displayed, the RSSI value is displayed as a numeral value at the digits $X_6$, $X_7$ and $X_8$, while the value of the bit error rate (BER value), which is detected during telephone communication, is displayed at the digit $X_9$.

The key switches 17 include digit keys 17a used as dial keys, one-touch dial keys 17b and function keys 17c. The function keys 17c include a send (SEND) key which is operated to send a call signal, an end (END) key which is operated to terminate the telephone communication, alphabet input (ALPH) key which is operated to allow the digit keys 17a to input alphabets, a pair of volume keys, a recall (RCL) key which is used to display various kinds of information stored in a RAM, a store (STO) key which is used to store information, input through the digit keys 17a, in the RAM, and a clear (CLR) key which is used to erase the information stored in the RAM. Of those keys, the function keys are operated to selectively specify the analog mode or digital mode, and to specify a mode to send a data signal, such as a facsimile image signal, for example.

The controller 20 has a microprocessor (MPU) 21. A ROM 22, a RAM 23 and an input/output (I/O) port 24 are connected via a bus 25 to this microprocessor 21. Stored in the ROM 22 in advance are all control programs and a part of control data necessary for radio communication. The RAM 23 stores the remaining control data necessary for radio communication and telephone number data of a destination station, or the like, input through the keys 17.

The microprocessor 21 performs various control processes concerning radio communication according to the control programs and control data stored in the ROM 22 and the control data stored in the RAM 23. The control processes include a sync establishing control process, a sync state monitoring control process, a sync restoring control process and a BER calculation/display process in addition to normal control processes, such as calling and receiving control, channel connection control and telephone communication control.

Reference numeral "19a" denotes a power source circuit which produces a desired operation voltage Vcc based on the output of a battery 19b and supplies this voltage to the aforementioned individual circuits.

The operation of the thus constituted portable telephone will be described below.

When a calling operation is performed or a signal reception occurs, the controller 20 executes the following sync establishing control as a sequence of processes to form a radio telephone link. FIG. 7 presents a flowchart illustrating the procedures of that control. First, the controller 20 sends a reception slot indicating information RSIND to the sync/clock extractor 65 of the digital demodulator 6 in step 7a. In the next step 7b, the controller 20 sends a sync acknowledge indicate signal ACKI to the sync/clock extractor 65 as shown by A0 in FIG. 11.

The sync/clock extractor 65 starts the sync establishing operation upon reception of the sync acknowledge indicate signal ACKI. The sync/clock extractor 65 detects a SYNC signal in each slot of the time-division multiplexed signal and collates the SYNC signal with the SYNC signal corresponding to the reception slot specified by the reception slot indicating information RSIND. When detecting the received SYNC signal that matches with the specified SYNC signal, the sync/clock extractor 65 checks if the received SYNC signal is correctly received in a given subsequent period, and establishes synchronized reception when that signal is correctly received. When synchronized reception is established, the sync/clock extractor 65 sets a sync indicate signal SNCIND to be sent to the controller 20 to an "H" level as shown in FIG. 11.

After sending the sync acknowledge indicate signal ACKI, the controller 20 checks if the sync indicate signal SNCIND becomes an "H" level in step 7c. When this signal becomes the "H" level, the controller 20 judges that synchronized reception has been established, sets a sync establishing flag in step 7e, and then moves to control that is associated with normal telephone communication. Until the sync indicate signal SNCIND becoming an "H" level is detected in step 7c, the controller 20 reads the detected RSSI value from the receiving signal strength detector 31 in step 7d. The controller 20 displays the level of this detected RSSI value on the RSSI display section 18a of the display 18 and displays the numeral of the detected RSSI value at the digits $X_6$ to $X_8$.

When synchronized reception is established, the controller 20 performs monitor control on the synchronization state while executing control associated with telephone communication. FIG. 8 presents a flowchart illustrating the procedures of that control, which will be described below more specifically.

The controller 20 detects a CDVCC signal from the received data in step 8a, and determines whether or not the decoded data of the CDVCC signal is correct in step 8b. If this decoded data is correct, the controller 20 returns to the step 8a to repeat the described sequence of processes.

Suppose that under the above situation, the apparatus comes behind a building or inside a tunnel and the receiving signal strength of the radio frequency signal coming from the base station BS is temporarily deteriorated. In this condition, the sync/clock extractor 65 will not accurately receive the SYNC signal. When this state continues for a given period of time, the level of the sync indicate signal SNCIND changes to an "L" level as shown in FIG. 11. When the deterioration of the receiving signal strength further increases, the controller 20 cannot accurately detect the decoded data of the CDVCC signal. When the decoded data of the CDVCC signal is not correctly detected, i.e., when the CDVCC signal is not good (NG), the controller 20 moves to step 8c from step 8b. The controller 20 counts the consecutive number of occurrence of NG in step 8c. The controller 20 determines in step 8d if the count value of NG reaches "5." If NG has not been counted five times yet, the controller 20 returns to the step 8a to repeat the described sequence of processes.

When the consecutive NG count reaches "5," the controller 20 moves to step 8e to determined whether or not the level of the sync indicate signal SNCIND output from the sync/clock extractor 65 is an "L" level. When the sync indicate signal SNCIND is an "L" level, the controller 20 judges that disconnection of synchronized reception has occurred and resets a sync flag in step 8f. The controller 20 also sets the fade timing status to an "H" level. The duration of the "H" level of the fade timing status indicates a radio-link cutoff allowance period.

When sync disconnection occurs, the controller 20 executes sync restoring control. FIG. 9 presents a flowchart illustrating the procedures of that control. First, the controller 20 checks in step 9a whether or not the preset cutoff allowance period (e.g., 5 seconds) has elapsed after the fade timing status has become the "H" level. If 5 seconds have not passed yet, the controller 20 advances to step 9b and sends the sync acknowledge indicate signal ACKI to a synchronizer 6a for re-synchronization as shown by A1 in FIG. 11. Then, the sync/clock extractor 65 performs a sync establishing operation. Suppose that under the above condition, the apparatus comes out of a building or a tunnel and the radio frequency signal can be received at a sufficiently high receiving signal strength. Then, synchronized reception is established in the sync/clock extractor 65. As a result, the sync indicate signal SNCIND becomes an "H" level as shown in FIG. 11.

After sending the sync acknowledge indicate signal ACKI for restoration of synchronization, the controller 20 checks if the sync indicate signal SNCIND becomes an "H" level in step 9c while checking if a preset given time ΔT has elapsed in step 9d. When the sync indicate signal SNCIND becomes an "H" level within the given time ΔT as shown in FIG. 11, the controller 20 judges that the synchronized reception is restored and returns to step 7e in FIG. 7. In this step 7e, the sync flag is set again. The portable telephone is set back to the synchronized reception condition in this manner.

Suppose that the sync indicate signal SNCIND does not become an "H" level within the given time ΔT as shown in FIG. 12. In this case, the controller 20 returns to step 9a from step 9d. The controller 20 then determines whether or not 5 seconds have passed after the fade timing status has becomes an "H" level. If 5 seconds have not passed yet, the controller 20 goes to step 9b again and sends the sync acknowledge indicate signal ACKI to the synchronizer 6a as shown by A2 in FIG. 12. Accordingly, the sync/clock extractor 65 performs the sync establishing operation again.

Suppose that even this sync establishing operation does not establish synchronized reception within the given time ΔT and the sync indicate signal SNCIND stays the "L" level. In this case, the controller 20 re-sends the sync acknowledge indicate signal ACKI to the sync/clock extractor 65 again as shown by A3 in FIG. 12. Accordingly, the sync/clock extractor 65 performs the sync establishing operation again. Suppose that this sync establishing operation has established synchronized reception and the sync indicate signal SNC-IND becomes an "H" level within the given time ΔT as shown in FIG. 12. Then, the controller 20 judges that the synchronized reception is restored and returns to step 7e in FIG. 7.

Suppose that even this sync establishing operation does not establish synchronized reception is not established by the above-described repetitive sending of the sync acknowledge indicate signal ACKI to the sync/clock extractor 65 from the controller 20 and preset set T seconds (5 seconds) have therefore passed after the fade timing status has become an "H" level as shown in FIG. 13. Then, the controller 20 judges that reestablishment of synchronized reception is not possible and moves to step 9e where the controller 20 performs a process for cutting off the radio telephone link to be ready for next reception.

A description will now be given of a process for calculating and displaying the bit error rate in the portable telephone according to this embodiment. FIG. 10 presents a flowchart illustrating the procedures of that process.

The controller 20 starts a process for calculating the initial value of the BER when synchronized reception is established. The BER initial value is obtained by detecting the number of bit error in each of first 50 slots that this control should receive and averaging the bit error rates of those 50 slots. FIG. 14 shows an example of the timing at which the BER initial value is calculated. The illustrated example is for the case where a slot TS1 is assigned as a reception target slot in a full-rate system. The hatched slot in the diagram is the target slot.

When synchronized reception is established, the controller 20 first sets the count value n of a counter in step 10a. Then, the controller 20 detects the number of bit errors Err(1) corresponding to the count value (n=1) of the counter in step 10b. This bit error number Err(1) is detected by comparing received data before error correction and decoding in the channel-codec 8 with the received data after this processing. When the bit error rate Err(1) of the first slot is detected, the controller 20 moves to step 10d from step 10c to increment the count value n of the counter (n=n+1) and detects the bit error rate Err(2) corresponding to the count value n=2 after the increment. Thereafter, the routine from step 10b to step 10d is repeated until n=50 is detected in step 10c. Accordingly, the bit error rates Err(3) to Err(50) of the reception target slots are sequentially detected. The bit error rates Err(3) to Err(50) detected in the individual reception target slots are temporarily stored in the RAM 23.

When the detection of the bit error rates Err(1) to Err(50) for the mentioned 50 slots is completed, the controller 20 computes the sum Sum(n) of those bit error rates Err(1) to Err(50) in step 10e. The equation for this computation is:
Sum(n)=Err(n−49)+Err(n−48)+ . . . +Err(n−1)+Err(n)

Subsequently, the controller 20 computes the average value $\overline{Sum}(n)$ of the sum Sum(n) of the bit error rates for the 50 slots in step 10f. The equation for computing this average value $\overline{Sum}(n)$ is given below.

$$\overline{Sum}(n)=Sum(n)/(50\ slots)$$

This computed average value $\overline{Sum}(n)$ of the bit error rates for 50 slots becomes the initial value of the BER. To compute this BER initial value, about one second is needed since one frame is 40 msec as shown in FIG. 14.

Next, the controller 20 converts the average value $\overline{Sum}(n)$ of the bit error rates to a BER code expressed in eight levels in step 10g. FIG. 15 shows one example of the correlation between the average value $\overline{Sum}(n)$ of the bit error rates and the BER code. This BER code is displayed at the $X_9$-th digit of the display 18 in step 10h as shown in FIG. 16. In this case, when the value of the BER code becomes equal to or above "6," the BER code is blinked.

When the initial value of the bit error rate is detected, upon each reception of a new reception target slot (n=51, n=52, ....), the controller 20 obtains a new average value of the bit error rates based on the value of the bit error rate detected for the new reception target slot and the initial value of the bit error rate.

More specifically, when confirming that communication is continuing in step 10i, the controller 20 increments the count value n of the counter in step 10j and the bit error rate Err(n) for the reception slot corresponding to the incremented count value n in step 10k. Next, the controller 20 computes a new sum Sum(n) of the bit error rates by adding the detected value Err(n) of the bit error rate of the new reception slot to the previous one. The equation for this computation is given below.

$$Sum(n)=Sum(n-1)-\overline{Sum}(n)+Err(n)$$

When this new Sum(n) is computed, the controller 20 returns to step 10f where it computes a new average value $\overline{Sum}(n)$ based on the computed new sum Sum(n). Then, the controller 20 converts the new average value $\overline{Sum}(n)$ of the bit error rates to a BER code expressed in eight levels in step 10g, and displays the BER code at the $X_9$-th digit of the display 18 in step 10h.

In this manner, the BER code is updated every time a new reception target slot (n=51, n=52, ....) is received. That is, after the initial value of the bit error rate is computed, the display value of the BER is updated at the interval of 20 msec.

According to the portable telephone of this embodiment, as described above, the controller 20 is provided with the sync restoring function. When sync disconnection is detected during telephone communication, this sync restoring function gives the sync acknowledge indicate signal ACKI to the sync/clock extractor 65 to permit the sync/clock extractor 65 to perform an operation to restore synchronized reception. Even in the case where the apparatus comes behind a building or inside a tunnel to cause temporary deterioration of the receiving signal strength and synchronized reception is disconnected as a consequence, if the receiving signal strength returns to the normal level within a cutoff allowance period (5 seconds), the portable telephone can be restored to the sync established state by the synchronized-reception restoring operation before the radio telephone link is actually cut. That is, even when the receiving signal strength of the radio frequency signal temporarily drops, the cutoff of the radio telephone link every time will be prevented, thus permitting the telephone communication to continue.

According to this embodiment, the sync acknowledge indicate signal ACKI is repeatedly given to the sync/clock extractor 65 at a given time interval ΔT within the cutoff allowance period T until the synchronized reception is restored. As compared with the case where the sync acknowledge indicate signal ACKI is given only once, therefore, the chance of restoring synchronized reception can be improved.

Further, according to this embodiment, the bit error rate is detected during telephone communication and the result of detecting the bit error rate is displayed at the digit $X_9$ of the display 18. Accordingly, the user can accurately know the deterioration of the reception quality from the value of the displayed bit error rate. That is, in a place where multi-path phasing occurs such as in a building area, the error rate of the received data may increase even with a sufficiently high receiving signal strength, and the quality of the received speech may be impaired. According to the portable telephone of this embodiment, however, the user can determine why the synchronized reception is deteriorated from the displayed value of the bit error rate, thereby preventing the user from erroneously judging the deterioration of the reception condition as a malfunction of the apparatus.

According to this embodiment, at the time the bit error rate is calculated, the computation of the bit error rate starts when synchronized reception is established. Therefore, bit error information representing the bit error rate can be displayed immediately, as compared with the case where the computation of the bit error rate starts in accordance with, for example, the input of the bit-error display instruction through a function key or the like.

Further, according to this embodiment, after the initial value of the bit error rate is obtained, the displayed value of the bit error rate is updated based on this initial value and the error bit rate of a new reception target slot. Every time a new reception target slot is received, therefore, the computation time can be shortened to increase the response of the display updating operation of the bit error rate, as compared with the case where a new bit error rate is computed using all the bit error rates detected in the previous many slots. It is also possible to reduce the memory capacity necessary for the computation to update the bit error rate.

According to this embodiment, when the detected value of the bit error rate increases to or above the BER code "6," the BER code blinks. The user can therefore clearly recognize the deterioration of the BER.

The present invention is not limited to this embodiment, but may be modified in various other forms as follows. Although the sync restoring control of the controller 20 starts when the fade timing status becomes an "H" level as shown in FIG. 11 in the above embodiment, this sync restoring control may start when the sync indicate signal SNCIND output from the sync/clock extractor 65 becomes an "H" level as shown in FIG. 17.

The sync restoring control may be designed to start based on the result of the determination of the BER. That is, the controller 20 compares the computed BER value with a pre-set threshold value. When the computed BER value becomes equal to or below the threshold value, the controller 20 considers that synchronized reception is substantially disconnected, and starts the sync restoring control thereafter. FIG. 18 shows the timing for that control.

Further, information indicating that the sync restoring operation is in progress may be displayed on the LCD 18 or another display means during the cutoff allowance period. In this manner, the user can clearly know why the received speech of the person at the destination is cut off.

Figure 19:
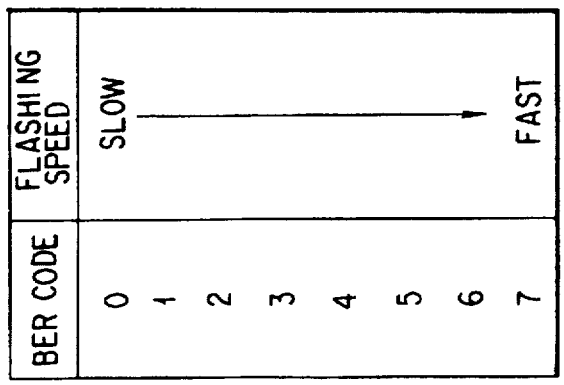
FIG. 19 is a diagram showing the display style of a BER code in a portable telephone according to a still further embodiment of this invention.
Figure 20:
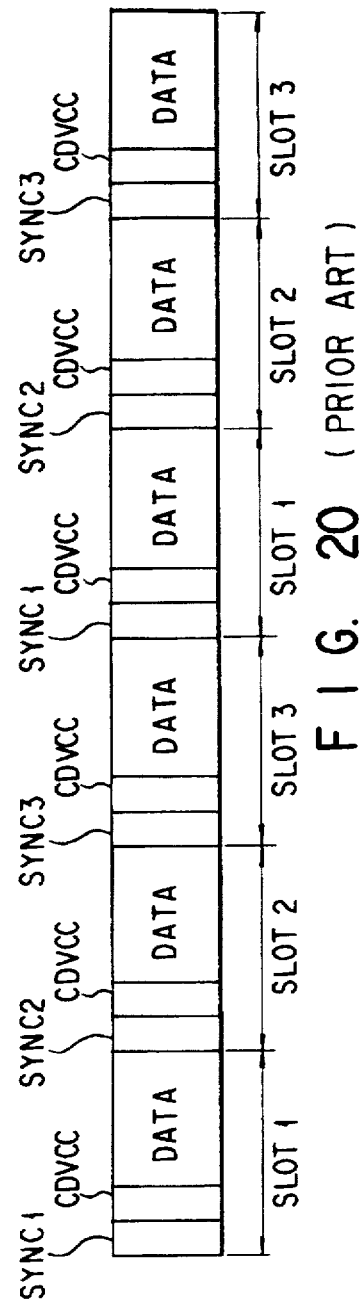
FIG. 20 is a diagram showing the frame format of a time-division multiplexed signal transmitted by a system to which a digital communication system is applied.

Although the BER code blinks when the bit error rate is increased to or above "6" in the above-described embodiment, the blinking speed may be changed in accordance with an increase in the value of the BER code as shown in FIG. 19. This permits the user to clearly check a BER change at a glance. As the display form for the BER code, white and black inversion may be used instead of the blinking display. Further, an alarm may be generated instead of displaying the BER code on the display.

Although the BER code is always displayed during telephone communication in the above embodiment, the BER code may be displayed only when it becomes equal to or above an arbitrary level (e.g., "6"), or in response to the switching operation performed by the user. Further, the bit error rate may be computed and the BER code may be displayed, while the synchronized reception is disconnected and the sync restoring control is performed as a consequence.

In addition, the processing contents of the sync establishing control and sync state monitoring control, the period AT during which the sync acknowledge indicate signal ACKI is repeatedly output to the sync/clock extractor 65, the control procedures and control contents of the sync restoring control, the processing contents of the BER computation and display control, the type and structure of the mobile radio communication apparatus, etc. may be modified in various manners without departing from the scope of this invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mobile radio communication apparatus for use in a radio communication system in which is transmitted a time-division multiplexed signal having a plurality of slots time-division multiplexed and having a sync signal included in each slot, said apparatus comprising:

first sync establishing means, receiving said time-division multiplexed signal, for detecting said sync signal included in each slot and for establishing synchronized reception of said time-division multiplexed signal when said sync signal is detected a predetermined number of times at intervals corresponding to a reception cycle of said time-division multiplexed signal;

sync state monitoring means for monitoring a state of synchronized reception established by said first sync establishing means;

radio link cutoff means for cutting off an associated radio link when disconnection of synchronized reception is detected by said sync state monitoring means and said disconnection of synchronized reception continues for a first predetermined period; and second sync establishing means for performing an operation to restore synchronized reception of said time-division multiplexed signal during a period from a time when said disconnection of synchronized reception is detected by said sync state monitoring means to a time when said radio link is cut off by said radio link cutoff means.

2. The mobile radio communication apparatus according to claim 1, wherein said second sync establishing means repeats said operation for restoring said synchronized reception until said synchronized reception is restored.

3. The mobile radio communication apparatus according to claim 1, wherein said second sync establishing means has means for displaying information indicating that an operation to restore synchronized reception is being carried out, while execution of said operation is in progress.

4. The mobile radio communication apparatus according to claim 1, wherein said sync state monitoring means recognizes that disconnection of synchronized reception has occurred when detection of said sync signal to be detected fails.

5. The mobile radio communication apparatus according to claim 1, wherein said sync state monitoring means recognizes that disconnection of synchronized reception has occurred, when detection of said sync signal to be detected fails and correct reception of coded digital verification color data consecutively fails during a second period.

6. The mobile radio communication apparatus according to claim 1, wherein said sync state monitoring means monitors said state of synchronized reception established by said first sync establishing means, based on a bit error of said received time-division multiplexed signal, and recognizes that disconnection of synchronized reception has occurred when said bit error increases to or above a predetermined number.

7. A mobile radio communication apparatus for use in a radio communication system in which a time-division multiplexed signal, having a plurality of slots time-division multiplexed, is transmitted said apparatus comprising:

bit error detecting means for detecting a bit error amount in each reception assign slot, for finding, based on a detected value corresponding to each reception assign slot, an average value of respective bit error amounts over a plurality of the reception assign slots, and for, every time a new reception assign slot is received, updating the average value based on a detected value of a corresponding bit error amount; and display means for displaying information of bit errors based on the average of the value of bit errors detected by said bit error detecting means.

8. The mobile radio communication apparatus according to claim 7, wherein said display means has switch input means for inputting a display instruction to display information of bit errors based on said average value of the bit error amounts detected by said bit error detecting means in accordance with said display instruction of said switch input means.

9. The mobile radio communication apparatus according to claim 7, further comprising:

received signal strength detecting means for detecting a received signal strength of said time-division multiplexed signal; and wherein said display means selectively displays on a common display unit information of bit errors based on the average value of the bit error amounts detected by said bit error detecting means and information of said received signal strength detected by said received signal strength detecting means.

10. A mobile radio communication apparatus for use in a radio communication system in which a time-division multiplexed signal, having a plurality of slots time-division multiplexed, is transmitted, said apparatus comprising:

bit error detecting means for detecting the number of bit errors received in successive slots of said time-division multiplexed signal;

means for dividing a dynamic range from a minimal value to a maximal value of those bit error amounts detected by the bit error detecting means into a plurality of short ranges, for comparing a detected value of the bit error number obtained by the bit error detecting means with the plurality of short ranges and for deciding a short range containing the detected value corresponding to the bit error number; and displaying means for displaying information representing the short range which is decided as containing the detected value corresponding to the bit error number by the deciding means.

11. A mobile radio communication apparatus according to claim 10, further comprising:

received signal strength detecting means for detecting a received signal strength of said time-division multiplexed signal; and wherein said displaying means selectively displays, on a common display unit, information representing the short range decided by said deciding means and the received signal strength detected by said received signal strength detecting means.

12. A mobile radio communication apparatus for use in a radio communication system in which a time-division multiplexed signal, having a plurality of slots time-division multiplexed, is transmitted, said apparatus comprising:

bit error detecting means for detecting the number of bit errors received in successive slots of said time-division multiplexed signal;

converting means for converting the number of bit errors detected by said bit error detecting means into one of a plurality of bit error levels; and display means for displaying said one of the bit error levels obtained by said converting means;

wherein said display means provides a flashing display of said one of the bit error levels, with the flashing speed changing in accordance with said levels.

13. A mobile radio communication apparatus for use in a radio communication system in which a time-division multiplexed signal, having a plurality of slots time-division multiplexed, is transmitted, said apparatus comprising;

bit error detecting means for detecting the number of bit errors received in successive slots of said time-division multiplexed signal;

converting means for converting the number of bit errors detected by said bit error detecting means into one of a plurality of bit error levels; and display means for displaying said one of the bit error levels obtained by said converting means;

wherein said display means selects at least one of the bit error levels and provides a flashing display of said at least one of the bit error levels, said at least one of the bit error levels being higher than a predetermined level.

* * * * *